(12) United States Patent
Shimizu et al.

(10) Patent No.: US 8,956,051 B2
(45) Date of Patent: Feb. 17, 2015

(54) SEALED ROLLING BEARING

(75) Inventors: Yasuhiko Shimizu, Kuwana (JP); Tsukasa Toyoda, Kuwana (JP); Yoriko Kosaka, Kuwana (JP); Yuuki Ishizaki, Kuwana (JP); Fumihiro Murakami, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/498,601

(22) PCT Filed: Sep. 17, 2010

(86) PCT No.: PCT/JP2010/066210
§ 371 (c)(1),
(2), (4) Date: Mar. 28, 2012

(87) PCT Pub. No.: WO2011/040275
PCT Pub. Date: Apr. 7, 2011

(65) Prior Publication Data
US 2012/0219246 A1    Aug. 30, 2012

(30) Foreign Application Priority Data

Sep. 29, 2009    (JP) ................................ 2009-224493

(51) Int. Cl.
*F16C 33/76*    (2006.01)
*F16C 19/00*    (2006.01)
(Continued)

(52) U.S. Cl.
CPC ............... *B21B 31/07* (2013.01); *F16C 19/388* (2013.01); *F16C 33/7813* (2013.01); *F16C 33/7886* (2013.01); *F16C 33/726* (2013.01)
USPC ............ 384/479; 384/477; 384/473; 277/573

(58) Field of Classification Search
USPC ................. 384/479, 478, 474, 473, 459, 484; 277/551, 572–577; 137/538, 545, 550
See application file for complete search history.

(56) References Cited

U.S. PATENT DOCUMENTS 4,709,629 A * 12/1987 Appenzeller et al. ...... 100/162 B
4,804,027 A *  2/1989 Runels ........................ 152/417
(Continued)

FOREIGN PATENT DOCUMENTS

JP    7-65620    7/1995
JP    10-160013    6/1998
(Continued)

OTHER PUBLICATIONS

Machine Translation of JP 11-062996.*
(Continued)

*Primary Examiner* — Marcus Charles
*Assistant Examiner* — Yamilka Pinero Medina
(74) *Attorney, Agent, or Firm* — Wenderoth, Lind & Ponack, L.L.P.

(57) ABSTRACT

It is desired to prevent generation of negative pressure in a bearing space and to prevent entry of foreign matter such as water into a bearing. The bearing includes an inner race (1), an outer race (3), rolling elements (5) disposed between raceways (2 and 4) of the inner and outer races and retained by a retainer (6), and seal assemblies (7) provided at the respective ends of the outer race (3). Each seal assembly (7) includes a seal case (9) fitted on one end of the outer race (3), and an oil seal (11) mounted in the seal case. A check valve (20) is mounted in the seal case (9) and allows only a flow of gas from outside the bearing into the bearing space. A filter (29) is mounted in a flow passage in the check valve and allows passage of gas and prevents passage of liquid and solids.

25 Claims, 11 Drawing Sheets

(51) Int. Cl.
*B21B 31/07* (2006.01)
*F16C 19/38* (2006.01)
*F16C 33/78* (2006.01)
*F16C 33/72* (2006.01)

(56) References Cited

U.S. PATENT DOCUMENTS 6,866,489 B2 * 3/2005 Hinz et al. .................... 417/470
8,043,072 B2 * 10/2011 Maeda et al. ................ 417/313

FOREIGN PATENT DOCUMENTS

| JP | 11-062996 | 3/1999 |
| JP | 2007-298161 | 11/2007 |
| JP | 2009-144739 | 7/2009 |

OTHER PUBLICATIONS

Machine Translation of JP 2007-298161.*
International Search Report issued Dec. 14, 2010 in International (PCT) Application No. PCT/JP2010/066210.
English translation of the Written Opinion of the International Searching Authority issued Dec. 14, 2010 in PCT/JP2010/066210.
Chinese Office Action issued Aug. 13, 2014 in corresponding Chinese Application No. 201080043086.6 with partial English translation.

* cited by examiner

SEALED ROLLING BEARING

TECHNICAL FIELD

This invention relates to a sealed rolling bearing for rotatably supporting e.g. a roll neck of a roll used in a rolling machine.

BACKGROUND ART

Sealed rolling bearings having seal assemblies for sealing the bearing space defined between the inner and outer races are typically used in an environment where there are large amounts of foreign matter including rolling oil, water and scales, such as for supporting iron-manufacturing pressure rolls used in rolling machines, in order to ensure high lubricity and sealability and prevent entry of foreign matter.

Such sealed rolling bearings are typically four-row tapered roller bearings comprising an inner race, an outer race, tapered rollers disposed between the inner and outer races, a retainer retaining the tapered rollers so as to be circumferentially spaced apart from each other, and seal assemblies.

The seal assemblies each comprise an annular seal case fitted on one end of the outer race, and a seal mounted in the seal case. The seal prevents leakage of lubricant in a bearing space, and also prevents entry of foreign matter such as rolling oil, water and scales into the bearing space from outside the bearing.

But according to the use environment of such sealed rolling bearings, especially if the bearing temperature changes, it was impossible to sufficiently prevent entry of foreign matter such as water from outside, for the following reasons.

When the air pressure in the bearing space rises above the atmospheric pressure (positive pressure is reached) due to a rise in bearing temperature, air leaks out through small gaps in the seal assemblies. When the bearing temperature drops thereafter and the air pressure in the bearing space drops below atmospheric pressure (negative pressure is reached), foreign matter such as water enters the bearing space together with air. Foreign matter tends to deteriorate lubricant and shorten the lifespan of the bearing.

To avoid this problem, sealed rolling bearings are proposed in which rollers are disposed in the bearing space defined between the inner and outer races, oil seals retained by seal holders are provided at the respective axial ends of the bearing space to seal the bearing space, and vent means are provided in the respective oil seals (see e.g. JP Patent Publication 11-062996A).

With the bearing disclosed in JP Patent Publication 11-062996A, when the air pressure in the bearing space drops below the atmospheric pressure, the bearing space communicates with the outside of the bearing through the vent means of the respective oil seals, thus reducing the air pressure in the bearing space to be close to the atmospheric pressure.

But the sealed rolling bearing disclosed in JP Patent Publication 11-062996A has a problem that when the bearing space is brought into communication with the outside of the bearing through the vent means, it is difficult to prevent passage of foreign matter such as water through the vent means, so that the foreign matter tends to enter the bearing space together with air. The vent means thus cannot sufficiently prevent entry of the foreign matter into the bearing space.

An object of the invention is to prevent generation of negative pressure in the bearing space and to prevent entry of foreign matter into the bearing.

SUMMARY OF THE INVENTION

In order to achieve this object, the present invention provides a sealed rolling bearing comprising an inner race, an outer race, rolling elements disposed between the inner race and the outer race, and seal assemblies sealing a bearing space defined between the inner race and the outer race, wherein each of the seal assemblies comprises a check valve which allows only a flow of gas from outside the bearing into the bearing space and prevents a flow of gas from the bearing space to the outside of the bearing, the check valve having a flow passage through which gas flows and comprising a filter mounted in the flow passage and configured to allow passage of gas and prevent passage of liquid and solids.

If a negative pressure is created in the bearing space during use of the sealed rolling bearing according to the present invention, air is introduced into the bearing space from outside the bearing through the check valves of the respective seal assemblies until the negative pressure disappears. While air is being introduced into the bearing space from outside, the filters of the respective seal assemblies prevent entry of foreign matter such as rolling oil, water and scales into the bearing space from outside.

With the above-mentioned sealed rolling bearing including vent means provided in the respective seal members, when lubricant in the bearing space such as grease is splashed while the bearing is rotating the lubricant may adhere to the vent means, thus restricting passage of air through the vent means. This reduces the ability of the vent means to cancel negative pressure.

To solve this problem, each seal assembly comprises a seal case fitted on one end of the outer race, and a seal retained in position in the seal case, wherein the check valve is mounted in the seal case, the check valve further comprising a cylindrical valve main body defining the flow passage, and a valve body movable in the valve main body to selectively open and close the flow passage.

With this arrangement, since the check valve is mounted in the seal case, lubricant never adheres to the check valve. Air can thus freely flow through the check valve, so that negative pressure disappears quickly.

The filter may comprise a sheet member which allows passage of gas and prevents passage of liquid and solids, and is mounted in the passage between the valve body and the outside of the bearing. With this arrangement, the filter can be shaped and formed easily and freely according to the (sectional) shape of the flow passage of the valve main body of the check valve. Since the filter is provided between the valve body and the outside of the bearing, and thus foreign matter is removed by the filter before reaching the valve body, the movement of the valve body is not hindered by foreign matter. The flow passage can thus be smoothly opened and closed by the valve body, so that the check valve can fully and stably perform its expected function.

In order to increase the exposed surface area of the filter, the check valve may be configured such that the valve main body has a step extending radially inwardly from a radially inner surface of the valve main body at one end of the valve main body, and the filter is a cylindrical member having a radially outer surface and is movable together with the valve body, with one end thereof closed by the valve body and with the radially outer surface thereof in sliding contact with a radially inner surface of the step over the entire circumference of the radially outer surface of the filter.

In this arrangement, the filter may comprise a plurality of cylindrical filter members fitted one around another to increase the thickness of the filter and thus improve its ability to remove foreign matter.

In order to increase the surface area of the filter and thus improve its ability to remove foreign matter and water, a cylindrical cup-shaped member having a closed end may be used as the filter and this member may be mounted in the valve main body with the closed end facing the valve body.

One way to improve the ability of the filter to remove foreign matter would be to increase the number of times foreign matter contacts the filter. For this purpose, a plurality of the above-mentioned filters may be provided so as to be spaced apart from each other in the direction of the length of the valve main body.

Water vapor in the bearing space may turn into water drops due to a change in air pressure in the bearing space during use of the bearing or due to a drop in bearing temperature when the bearing stops rotating. In order to discharge such water drops to the outside of the bearing of the type in which each check valve includes a cylindrical valve main body defining a flow passage, a valve body movable in the flow passage for opening and closing the flow passage, and the filter, the check valve may be configured such that the valve main body is formed with a water discharge hole through which a portion of the flow passage between the filter and the valve body communicates with the outside of the bearing, whereby any water in the flow passage can be sucked into the water discharge hole by capillary action and then discharged to the outside of the bearing.

If the water discharge hole is formed in the valve main body, the check valve may be configured such that it further comprises a lid member fitted on an end portion of the valve main body facing the outside of the bearing and having an opening communicating with the flow passage, the lid member preventing separation of the filter from the valve main body, wherein the water discharge hole is formed in the end portion of the valve main body at a fitting portion between the valve main body and the lid member, whereby water in the flow passage is guided to the opening of the lid member through the fitting portion by capillary action.

With this arrangement, water in the portion of the flow passage between the filter and the valve body is guided through the discharge hole and the fitting portion between the end portion of the valve main body and the lid member to the opening of the lid member, and discharged to the outside of the lid member.

In this arrangement, a passage is preferably defined between the lid member and the end portion of the valve main body through which the fitting portion communicates with the opening of the lid member, whereby water in the flow passage can be efficiently guided to the opening of the lid member through the passage by capillary action.

If a plurality of the filters are provided so as to be spaced apart from each other in the length direction of the valve main body, water vapor may flow from the outer peripheries of the filters into the space between the inner periphery of the valve main body and the filters during use of the bearing, and the water vapor may turn into water drops due to a change in air pressure in the bearing space.

In order to discharge water drops in the above space, each check valve may be configured such that it further comprises a lid member fitted on an end portion of the valve main body facing the outside of the bearing and having an opening communicating with the flow passage, the lid member preventing separation of the filters from the valve main body, wherein a space is defined between at least one of the filters located nearer to the outside of the bearing and the radially inner surface of the valve main body, and wherein a passage is defined by the lid member and the end portion of the valve main body through which the space communicates with the outside of the bearing, whereby water in the space is discharged to the outside of the bearing through the passage by capillary action.

Advantages of the Invention

According to the present invention, the check valves provided in the respective seal assemblies serve to cancel negative pressure in the bearing space, and each seal assembly, and the filters of the respective check valves prevent passage of foreign matter. This slows down deterioration of lubricant in the bearing space due to foreign matter, thus extending the lifespan of the bearing.

DETAILED DESCRIPTION OF THE INVENTION

Figure 1:
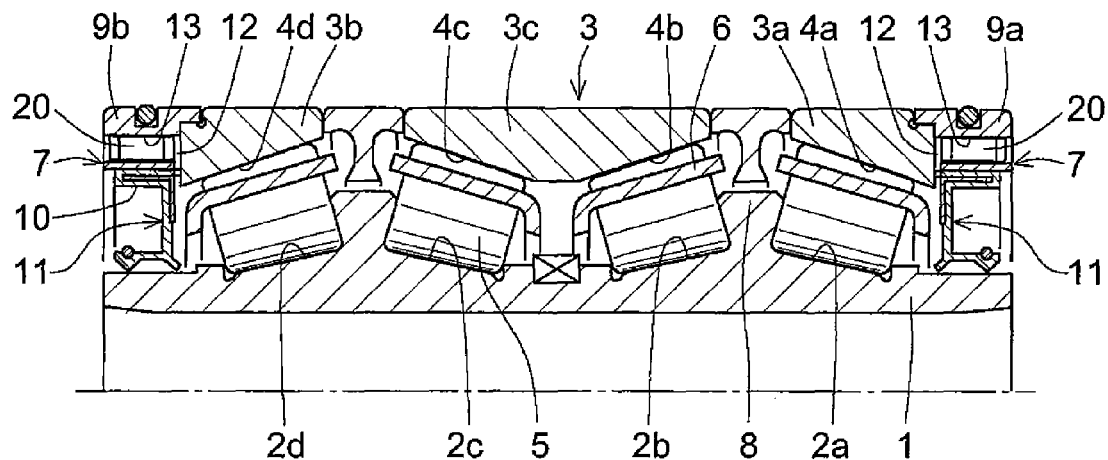
FIG. 1 is a sectional view of a sealed rolling bearing of Embodiment 1 according to the present invention.

Now the sealed rolling bearings embodying the present invention are described with reference to the drawings.

Embodiment 1

The sealed rolling bearing of Embodiment 1 is e.g. used to support a roll neck of a rolling mill. The rolling bearing shown is a sealed four-row tapered roller bearing. But the sealed rolling bearing is not limited to such a four-row tapered roller bearing, but may e.g. be a double-row cylindrical roller bearing, a multi-row cylindrical roller bearing, or a single row cylindrical roller bearing.

The sealed rolling bearing shown comprises two inner races 1 formed with two pairs of raceways 2a and 2b, and 2c and 2d, respectively, two outer races 3a and 3b each formed with a raceway 4a, 4d, an outer race 3c formed with two raceways 4b and 4c, four rows of tapered rollers 5 rollably disposed, respectively, between the four raceways 2a, 2d, 2b and 2c of the inner races 1 and the four raceways 4a, 4d, 4b and 4c of the outer races 3a, 3b and 3c, and four retainers 6 keeping the respective rows of tapered rollers 5 circumferentially spaced apart from each other. Each inner race 1 is formed with a large-diameter flange 8 at its axial center. During operation of the bearing, tapered rollers 5 roll on the respective raceways 2a-2d while being guided by the large-diameter flanges 8.

Seal assemblies 7 are fitted at the ends of the respective outer races 3a and 3b. The seal assemblies 7 are in sliding contact with the radially outer surfaces of the respective inner races 1, thereby sealing the bearing space between the inner races 1 and the outer races 3. Each seal assembly 7 comprises an annular seal case 9a, 9b fitted on the end of the outer race 3a, 3b, and a contact type oil seal 11 fitted in and held by the seal case 9a, 9b.

Figure 2:
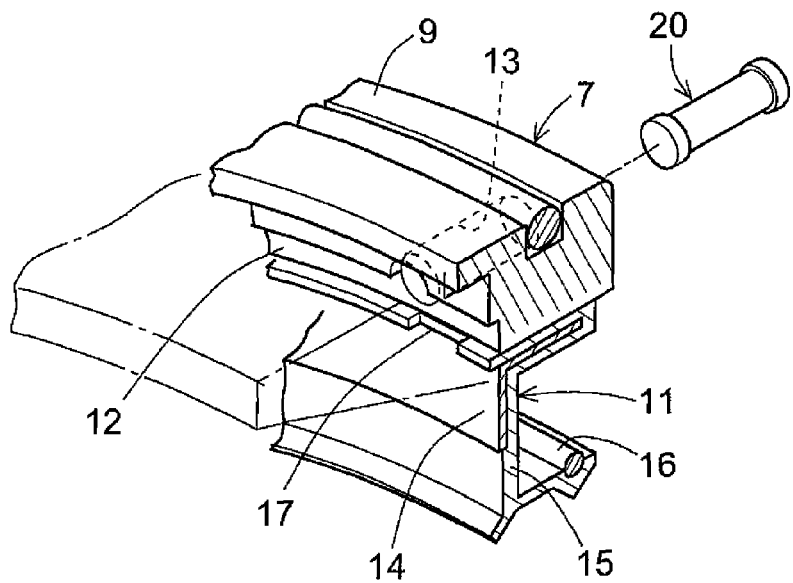
FIG. 2 is a perspective view of a seal assembly used in the bearing of FIG. 1.

As shown in FIG. 2, the seal case 9a, 9b is formed with an axially outwardly concave step 12 on the radially inner portion of the axially inner end surface of the seal case 9a, 9b over the entire circumference of the seal case 9a, 9b. The seal case 9a, 9b is further formed with an axial through hole 13 of which the axially inner opening is partially located at the step 12. Thus, with the seal assembly 7 fitted on the outer race 3, the through hole 13 communicates with the space defined by the end surface of the outer race 3a (see one-dot chain line) and the step 12.

The oil seal 11 comprises a metal core 14, a seal lip 15 made of an elastic material, and an O-ring 16. The metal core 14 is fixedly fitted in the radially inner portion of the seal case 9. The seal lip 15 is integrally fixed to the metal core 14 and is pressed against the radially outer surface of the inner race 1.

A cutout 17 is formed in the axially inner end of the elastic member covering the metal core 14. The cutout 17 is located radially inwardly of the through hole 13 of the seal case 9 (see FIG. 2). With each seal assembly 7 fitted on the outer race 3, the bearing inner space communicates with the exterior of the bearing through the space defined by the end surface of the outer race 3 and the step 12, and through the cutout 17 and the through hole 13.

A check valve 20 is fitted in the through hole 13 of the seal case 9 of each seal assembly 7 with a first end thereof located and facing axially outwardly of the bearing and a second end thereof located and facing axially inwardly of the bearing.

Figure 3:
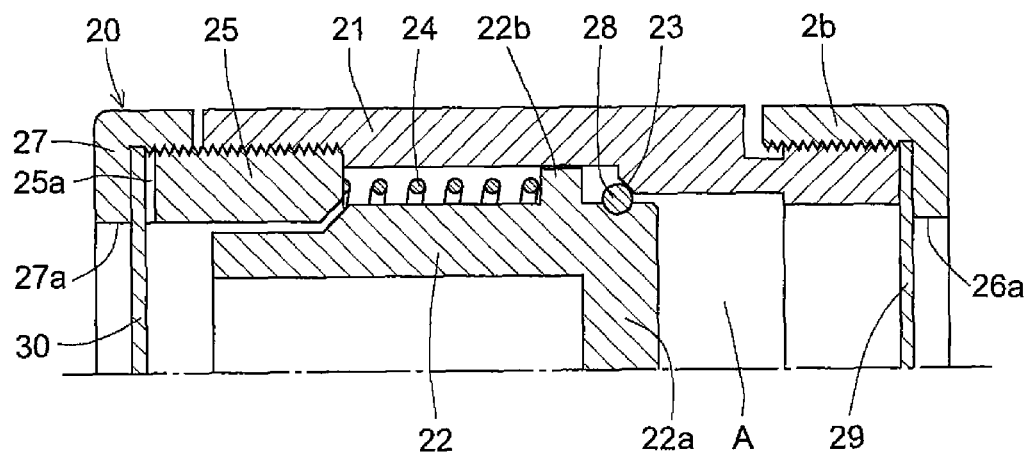
FIG. 3 is a sectional view of a check valve used in the bearing of FIG. 1.

As shown in FIG. 3, the check valve 20 includes a cylindrical valve main body 21 formed with a flow passage A through which gas flows, a valve body 22 configured to be moved into and out of contact with a seating surface 23 formed on the inner periphery of the valve main body 21, and a coil spring 24 biasing the valve body 22 in a direction to be pressed against the seating surface 23.

The valve main body 21 has a small-diameter portion at the first end thereof which has an outer diameter smaller than that of the main portion of the valve main body 21. A lid member 26 is in threaded engagement with the radially outer surface of the small-diameter portion. At the second end of the valve main body 21, a cylindrical lid fixing member 25 is in threaded engagement with the radially inner periphery of the valve main body 21. A lid member 27 is in threaded engagement with the radially outer periphery of the lid fixing member 25 at its distal end (axially inner end). The lid members 26 and 27 and the main portion of the valve main body 21 are equal in outer diameter to one another so that the check valve can be easily inserted into the through hole 13.

The valve body 22 is a cylindrical member having a closed end 22a located at the first end of the check valve and axially movable in the valve main body 21. A seal ring 28 is fitted on the outer periphery of the valve body 22 at its closed end 22a so as to be brought into and out of contact with the seating surface 23. The valve body 22 is made of a stainless steel, and has its surface subjected to rust preventive film treatment such as phosphate film treatment or zinc plating.

A flange 22b is formed on the radially outer surface of the valve body 22. The coil spring 24 is fitted around the valve body 22 and between the flange 22b and the end surface of the lid fixing member 25 in a compressed state. Thus, the compressed spring 24 biases the valve body 22 toward the first end of the valve main body 21 until the seal ring 28 contacts the seating surface 23, thus closing the flow passage A.

When, during use of the bearing, a negative pressure is produced in the bearing inner space, due to the pressure difference between the first and second end of the valve body 22, the valve body 22 moves toward the second end of the check valve against the biasing force of the coil spring 24, separating from the seating surface, thus opening the flow passage A.

The lid members 26 and 27 are both cylindrical members each having a closed end formed with an opening 26a, 27a communicating with the flow passage A of the valve main body 21. As shown in FIG. 4(a), a filter 29 in the form of a sheet covers the opening 26a, which is located at the first end of the valve main body 21. The filter 29 is sandwiched between the inner surface of the closed end of the lid member 26 and the end surface of the valve main body 21 at its first end so as to be inseparable from the valve main body 21.

A filter 30 in the form of a sheet covers the opening 27a, which is located at the second end of the valve main body 21. The filter 30 is sandwiched between the inner surface of the closed end of the lid member 27 and the distal end surface of the lid fixing member 25 so as to be inseparable from the valve main body 21.

Figure 4B:
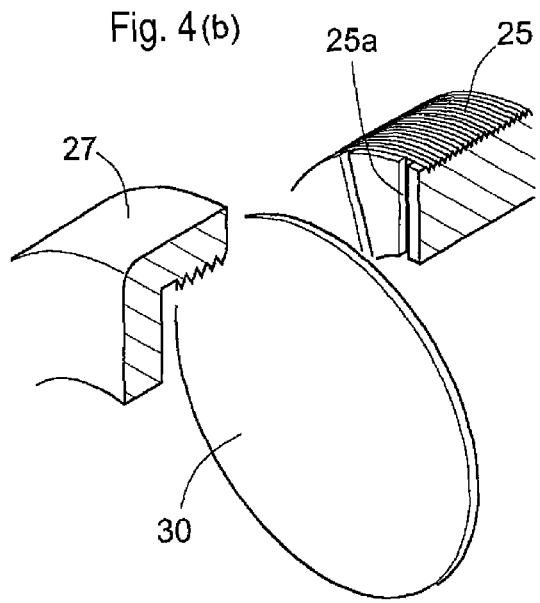
FIGS. 4(a) and 4(b) are exploded perspective views of the check valve of FIG. 3 at one and the other ends thereof, respectively.
Figure 4A:
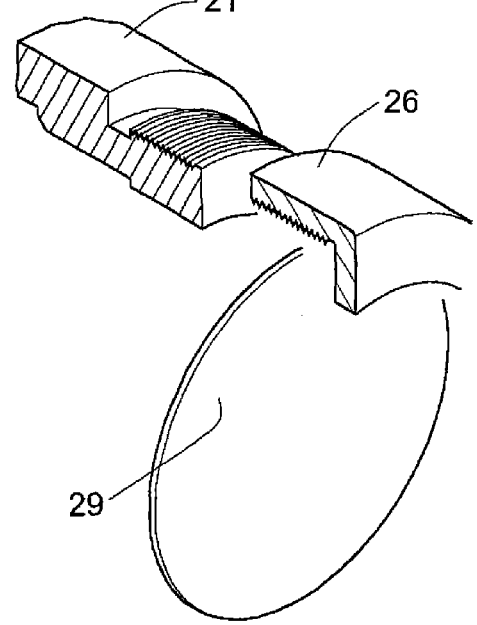

As shown in FIG. 4(b), a radial slit 25a is formed in the distal end surface of the lid fixing member 25. When the bearing is stopped and its temperature drops, water vapor in the portion of the flow passage A between the filter 30 and the valve body 22 may turn into water drops. Such water drops can be sucked through the slit 25a due to capillary action, and then introduced through the thread engagement portion between the lid member 27 and the lid fixing member 25 and along the radially outer surface of the valve main body 21 to the first end of the valve main body 21.

The filters 29 and 30 are configured to pass air (gas) but not liquid or solids. For example, the filters 29 and 30 may be sheets formed by complexing emulsion polymer film of polytetrafluoroethylene (PTFE) with polyurethane resin.

If a negative pressure is created in the bearing inner space during operation of the sealed rolling bearing of this invention, the valve body 22 of the check valve 20 of each seal assembly 7 moves toward the second end of the valve main body 21, thus opening the flow passage A, allowing outer air to be introduced into the bearing inner space until the negative pressure disappears.

When air (gas) is introduced into the bearing inner space, the filter 29 blocks foreign matter from outside the bearing, such as rolling oil, water and scales, and thus prevents entry of such foreign matter into the bearing inner space.

When the bearing is stopped and its temperature drops, or if the air pressure in the bearing inner space changes, water vapor in the portion of the flow passage A between the filter 30 and the valve body 22 may turn into water drops. The filter 30 prevents entry of such water drops into the bearing inner space.

In Example 1, the check valves 20 prevent negative pressure in the bearing inner space. The filters 29 and 30 prevent entry of foreign matter into the bearing inner space. This slows deterioration of lubricant in the bearing inner space and extends the lifespan of the bearing.

Figure 5:
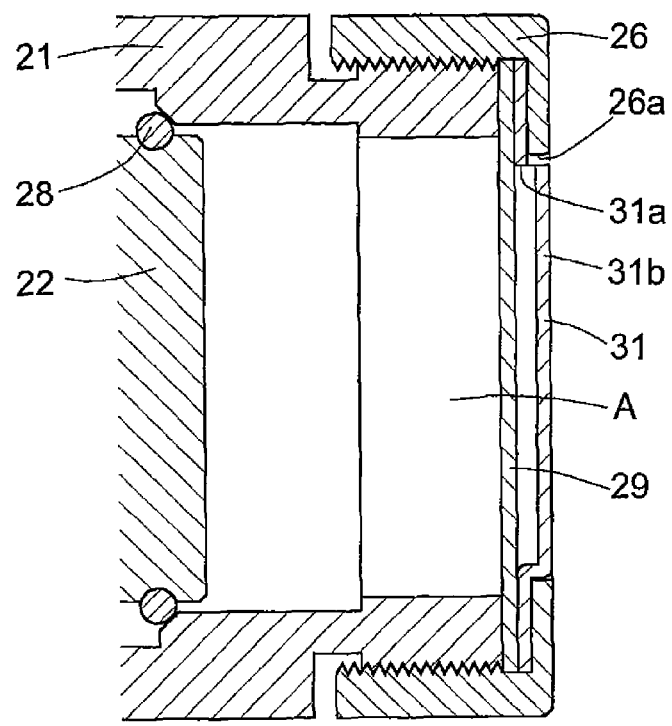
FIGS. 5 and 6 are a sectional view and an exploded perspective view, respectively, of a check valve of Modification 1 of Embodiment 1 at one end thereof.
Figure 6:
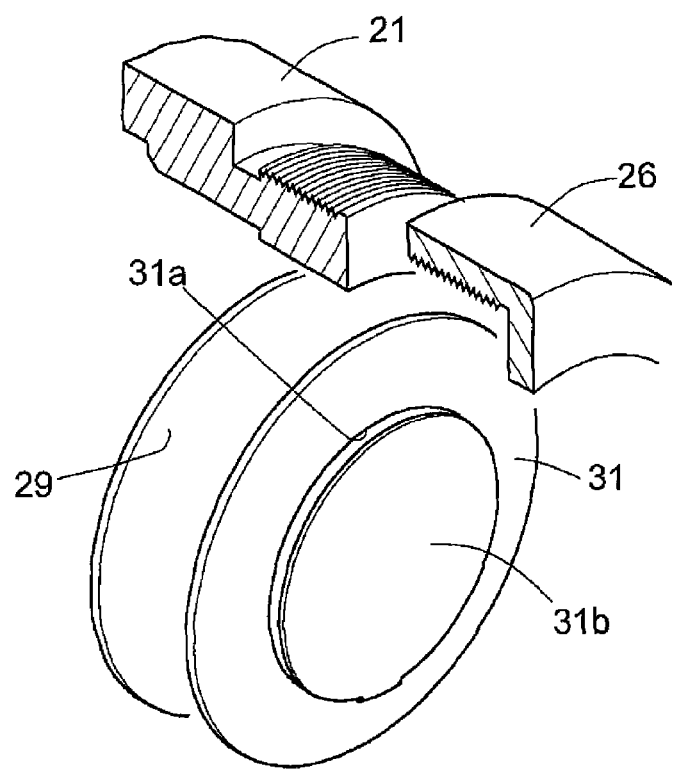

FIGS. 5 and 6 show Modification 1 of the check valve 20 of Embodiment 1.

In this modified embodiment, a cover plate 31 is provided outside the filter 29, i.e. the filter at the first end of the check valve 20. Otherwise, this modified embodiment is structurally identical to Embodiment 1. As shown in FIG. 5, the cover plate 31 covers the opening of the valve main body 21 at the first end thereof and is sandwiched between the first end of the valve main body 21 and the lid member 26, together with the filter 29.

The cover plate 31 has a cut-and raised portion 31b at its center which is axially outwardly spaced from and extends parallel to the remaining outer peripheral portion of the cover plate 31 (see FIG. 6). A slit 31a is defined between the central cut-and-raised portion 31b and the outer peripheral portion of the cover plate 31. The slit 31a communicates with the flow passage A of the valve main body 21.

The cover plate 31 is made of a stainless steel and can be manufactured by pressing. Its surface is subjected to rust preventive film treatment such as phosphate film treatment or zinc plating.

The cover plate 31 prevents entry of foreign matter such as water, rolling oil and scales through the first end of the check valve 20, which is exposed to the outside of the bearing, toward the filter. Only air can pass through the slit 31a.

Figure 7:
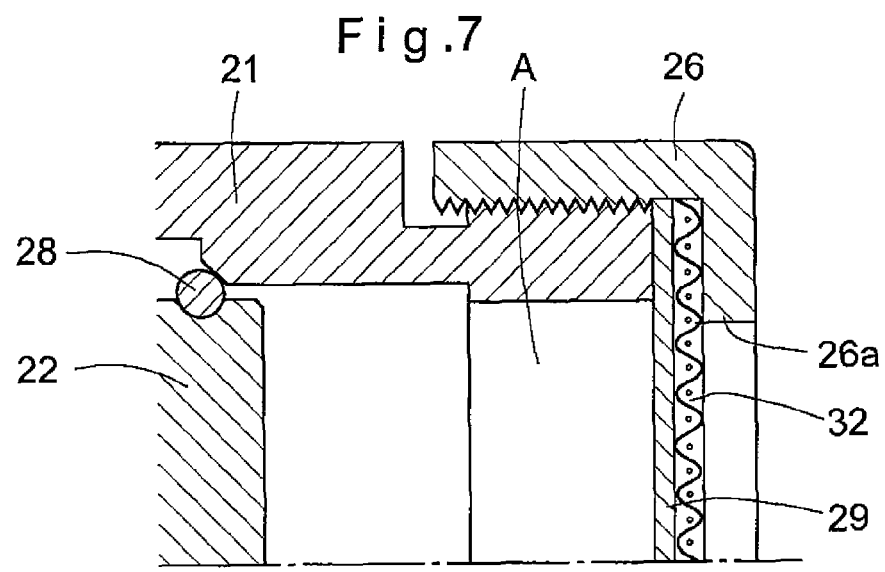
FIGS. 7 and 8 are a sectional view and an exploded perspective view, respectively, of a check valve of Modification 2 of Embodiment 1.
Figure 8:
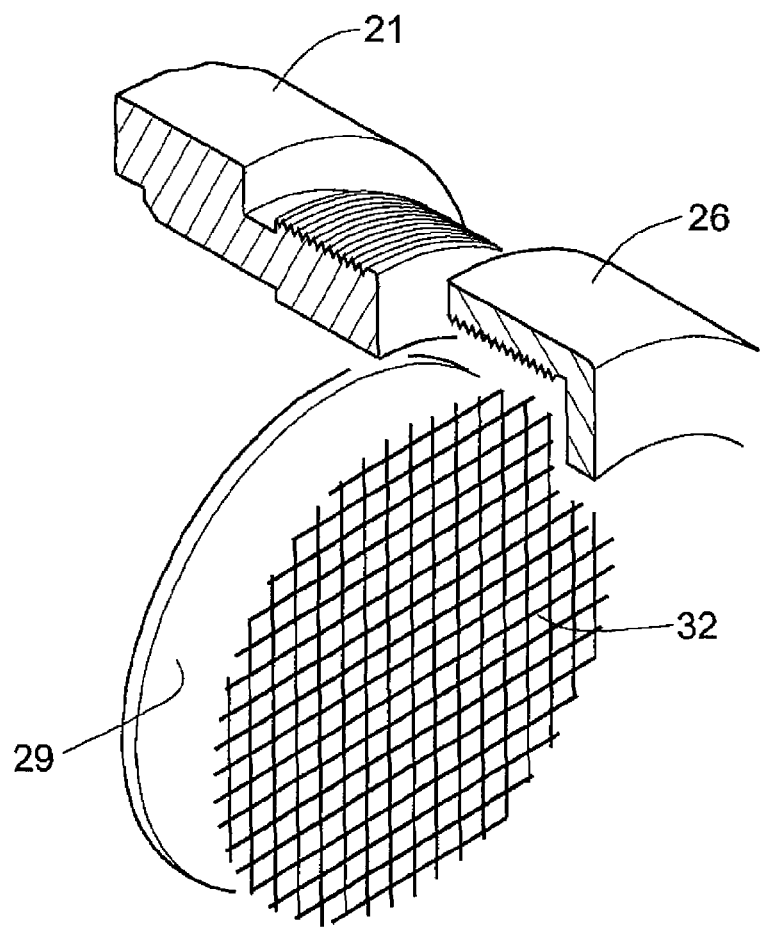

FIGS. 7 and 8 shows Modification 2 of the check valve 20 of Embodiment 1, in which instead of the cover plate 31, a wire gauze 32 is provided to cover the opening of the valve main body 21 at its first end. In Modification 2 too, the wire gauze 32 is sandwiched between the first end of the valve main body 21 and the lid member 26, together with the filter 29.

The mesh number of the wire gauze 32 is determined such that the wire gauze 32 can prevent entry of mainly solid foreign matter such as scales, based on the use environment of the bearing and the size of the check valve 20, and also based on actual operation, experiments, etc. The wire gauze 32 is made of stainless steel and has its surface subjected to rust preventive film treatment such as phosphate film treatment or zinc plating.

In Modification 2 too, as in Modification 1, the wire gauze prevents entry of foreign matter such as water, rolling oil and scales through the first end of the check valve 20, which is exposed to the outside of the bearing, toward the filter 29. Only air can pass through the gauze 32.

Figure 9:
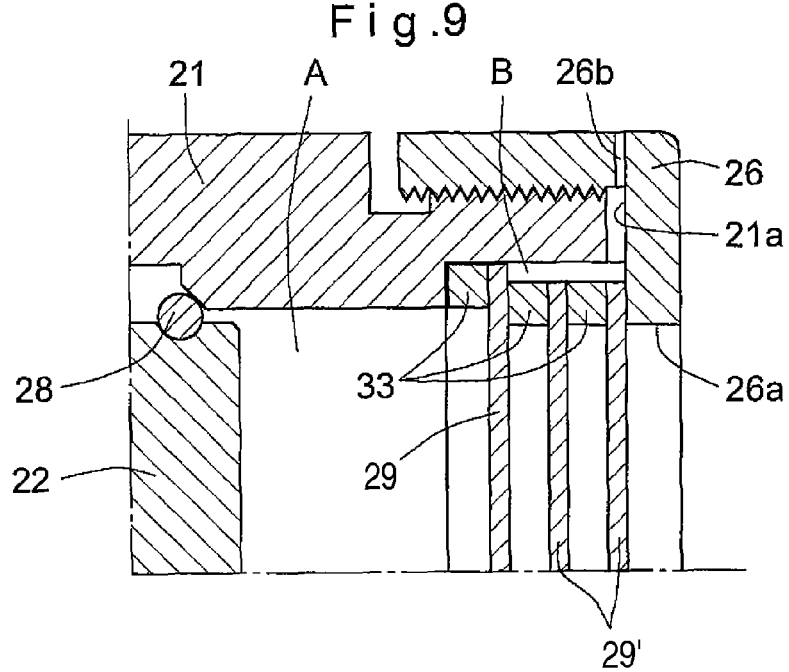
FIGS. 9 and 10 are a sectional view and an exploded perspective view, respectively, of a check valve of Embodiment 2 at one end thereof.
Figure 10:
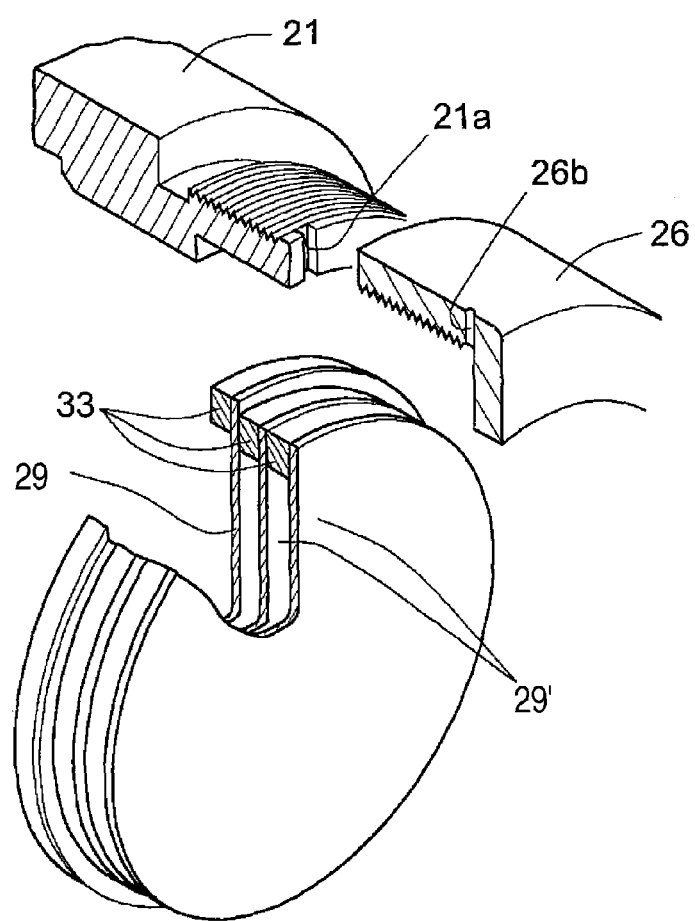

The first end of the valve main body 21, the lid member 26 and/or the filter 29, of the check valve 20 may have different structures from those shown, provided such altered structures can prevent entry of foreign matter into the bearing. FIGS. 9 and 10 show a check valve having such altered structures as Embodiment 2. Description of Embodiment 2 is now made of mainly what differs from Embodiment 1, and elements corresponding to those of Embodiment 1 are denoted by identical numerals.

Embodiment 2

As shown in FIG. 9, Embodiment 2 includes a plurality of filters 29 provided at the first end of the valve main body 21 which are spaced apart from one another in the length direction of the valve main body with spacers 33 disposed between the adjacent filters 29. With this arrangement, since the plurality of filters 29 individually trap foreign matter, it is possible to efficiently remove foreign matter.

In this embodiment, during use of the bearing, water vapor may flow into a space between the radially outer surfaces of the filters 29 and the radially inner surface of the valve main body 21 at the first end, and the water vapor may turn into water drops when the bearing is stopped and the bearing temperature drops or when the air pressure in the bearing changes.

Embodiment 2 includes means for expelling such water drops in the above gap to the outside of the bearing. As shown in FIG. 9, this means comprises a gap B defined between the radially outer surfaces of some of the filters 29 located axially outwardly of the bearing (i.e. the filters 29') and the radially inner surface of the valve main body 21, a radial slit 21a formed in the first end surface of the valve main body 21 and a water discharge hole 26b formed in the cylindrical portion of the lid member 26 (see also FIG. 10).

When the lid member 26 is fitted on the first end of the valve main body 21, the first end of the valve main body 21 and the lid member 26 define a passage (slit 21a and water discharge hole 26b) through which the gap B communicates with the outside of the valve main body 21.

In Embodiment 2, water drops in the gap B are sucked through the above passage due to capillary action and discharged to the outside of the valve main body 21. Thus water can be guided through the space between the valve main body 21 and the seal case 9 of the seal assembly 7 to the outside of the bearing.

Figure 11:
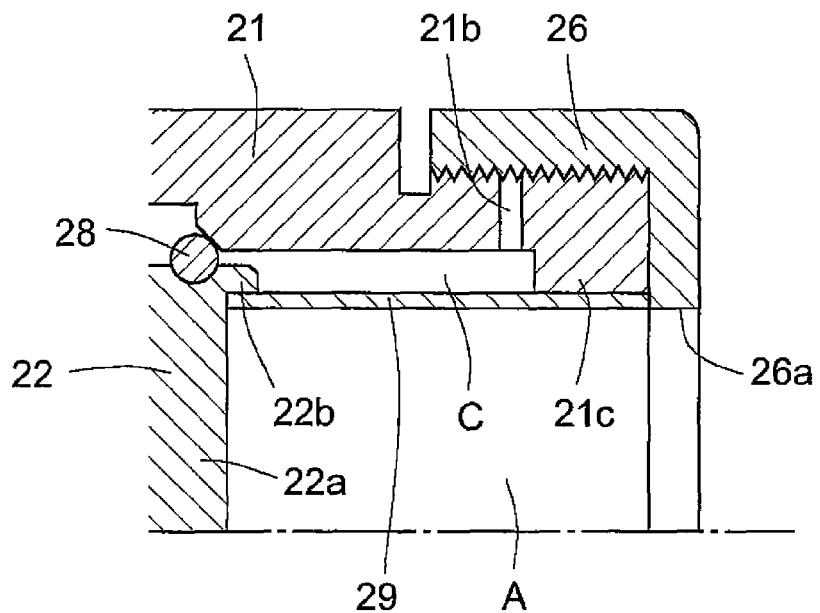
FIGS. 11 and 12 are a sectional view and an exploded perspective view, respectively, of a portion of a check valve of Embodiment 3.
Figure 12:
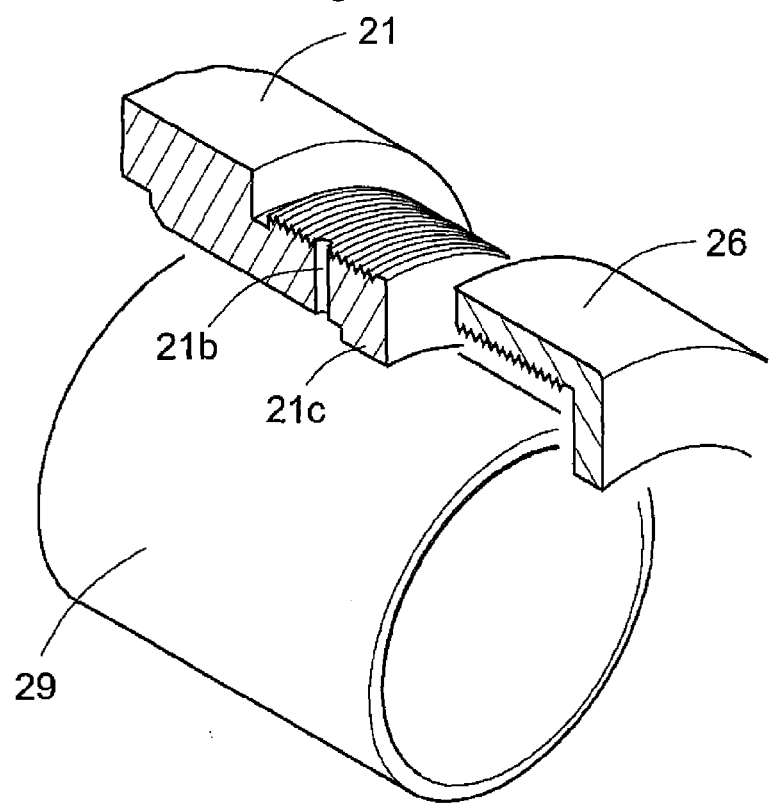

FIGS. 11 and 12 show Embodiment 3 of the present invention.

Embodiment 3

Embodiment 3 includes a cylindrical filter 29 having one end thereof closed by the closed end 22a of the valve body 22 so as be movable together with the valve body 22 with its radially outer surface in sliding contact over its entire circumference with the radially inner surface of the valve main body 21 at its first end.

In particular, as shown in FIG. 11, the cylindrical filter 29 has one end thereof closed by being fitted in an axial flange 22b formed on the closed end 22a of the valve body 22 along its outer periphery.

A radially inward step 21c is formed on the radially inner surface of the valve main body 21 at its first end. The filter 29 has its radially outer surface kept in sliding contact with the radially inner surface of the step 21c over its entire circumference. This arrangement increases the exposed surface area of the filter 29 and thus increases its ability to remove foreign matter.

In this embodiment, water vapor may turn into water drops in a space C in the flow passage A defined between the filter 29 and the valve body 22 shown in FIG. 11 due to a drop in bearing temperature when the bearing stops rotating or due to a change in air pressure in the bearing space.

In order to discharge such water drops to the outside of the bearing, a water discharge hole 21b may be formed through which the space C in the flow passage A communicates with the outside of the valve main body 21 (see FIG. 12). Any water in the space C in the flow passage A can be sucked through the water discharge hole 21b due to capillary action and guided through the fitting portion between the first end of the valve main body 21 and the lid member 26 to the hole 26a of the lid member 26, which opens to the outside of the bearing.

Figure 13:
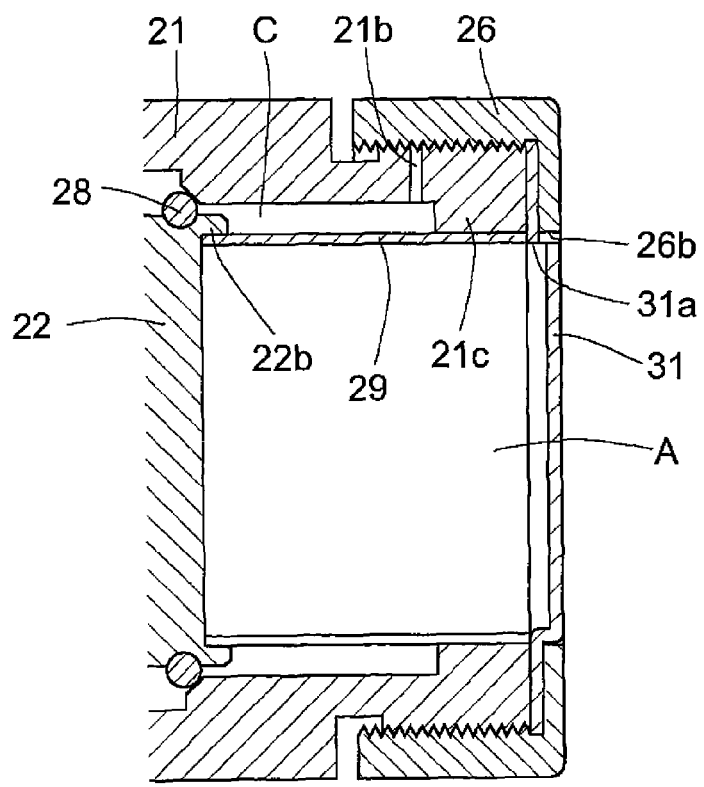
FIGS. 13 and 14 are a sectional view and an exploded perspective view, respectively, of a portion of a check valve of Modification 1 of Embodiment 3.
Figure 14:
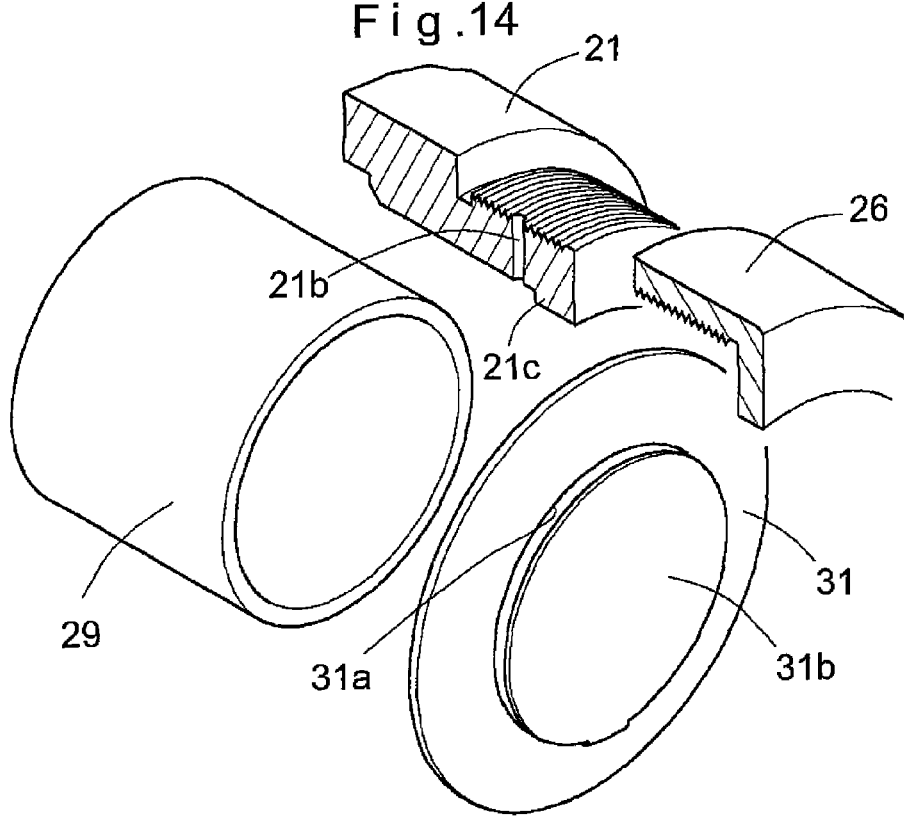
Figure 15:
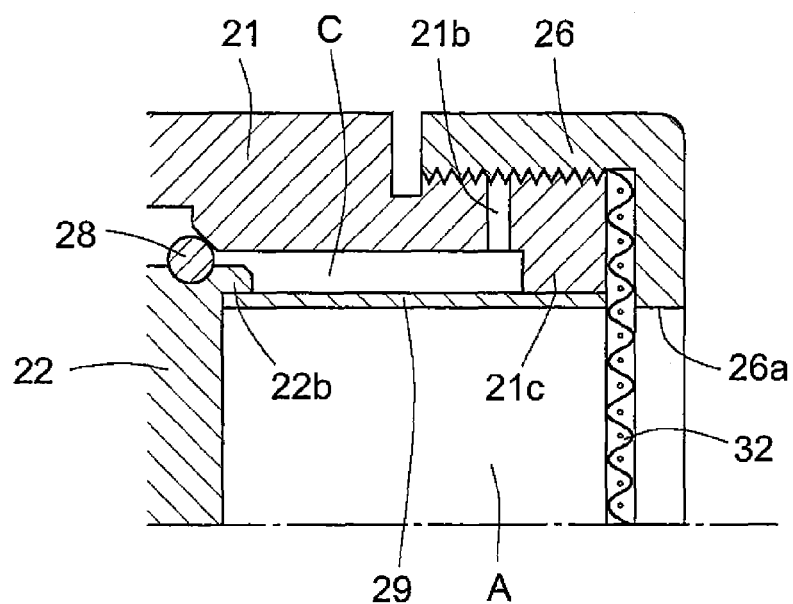
FIGS. 15 and 16 are a sectional view and an exploded perspective view, respectively, of a portion of a check valve of Modification 2 of Embodiment 3.
Figure 16:
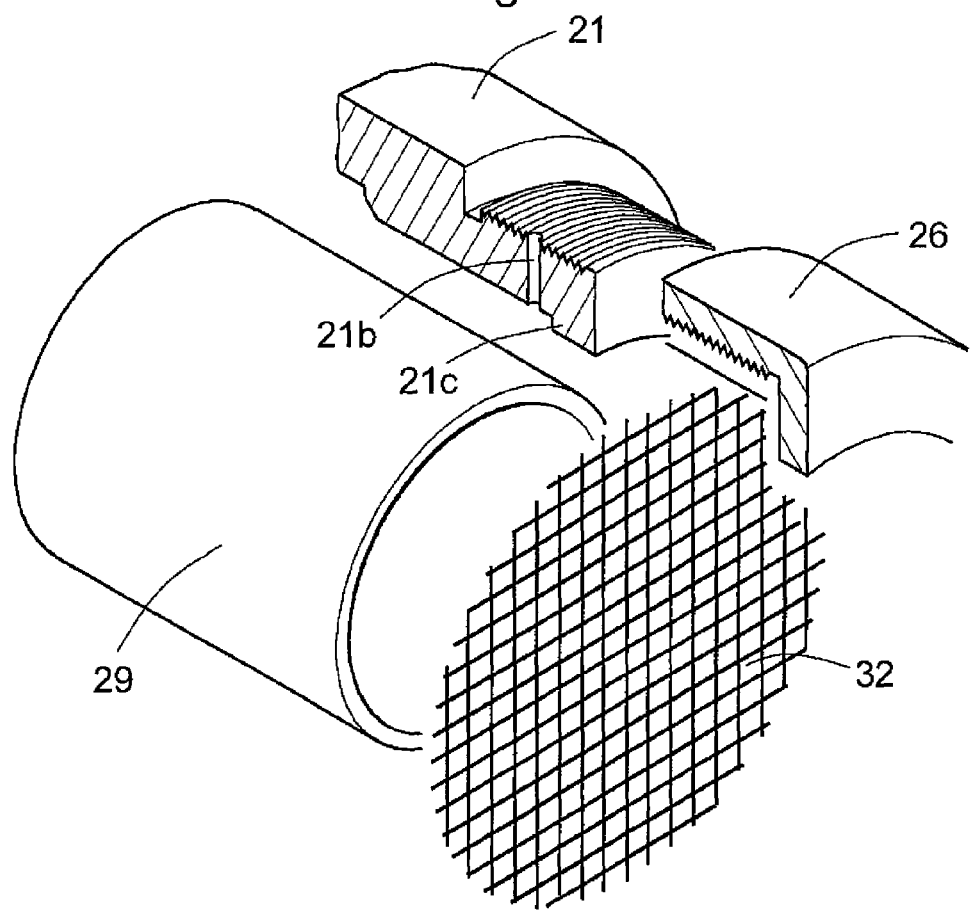

FIGS. 13 and 14 show the Modification 1 of Embodiment 3, in which a cover plate 31 similar to the one used in Modification 1 of Embodiment 1 is provided at the first end of the valve main body 21. FIGS. 15 and 16 show Modification 2 of Embodiment 3, in which a wire gauze 32 similar to the one used in Modification 2 of Embodiment 1 is provided at the first end of the valve main body 21.

Figure 17:
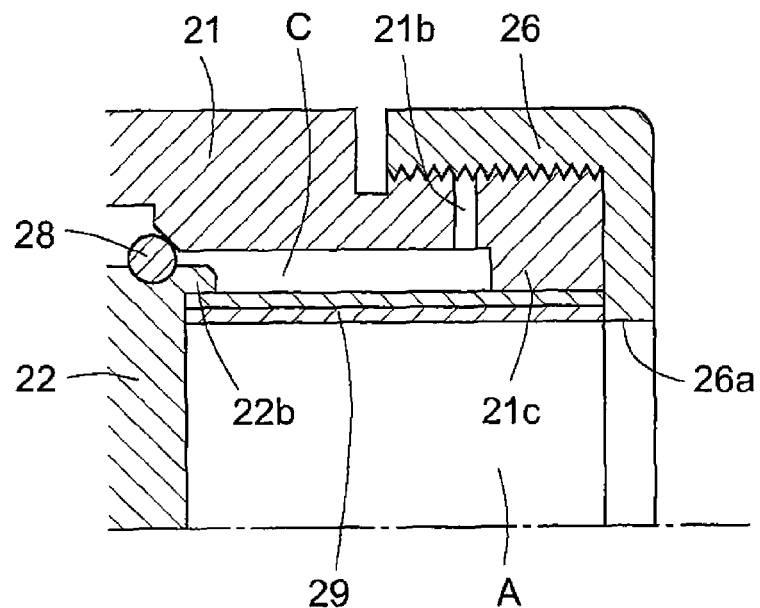
FIGS. 17 and 18 are a sectional view and an exploded perspective view, respectively, of a portion of a check valve of Embodiment 4.
Figure 18:
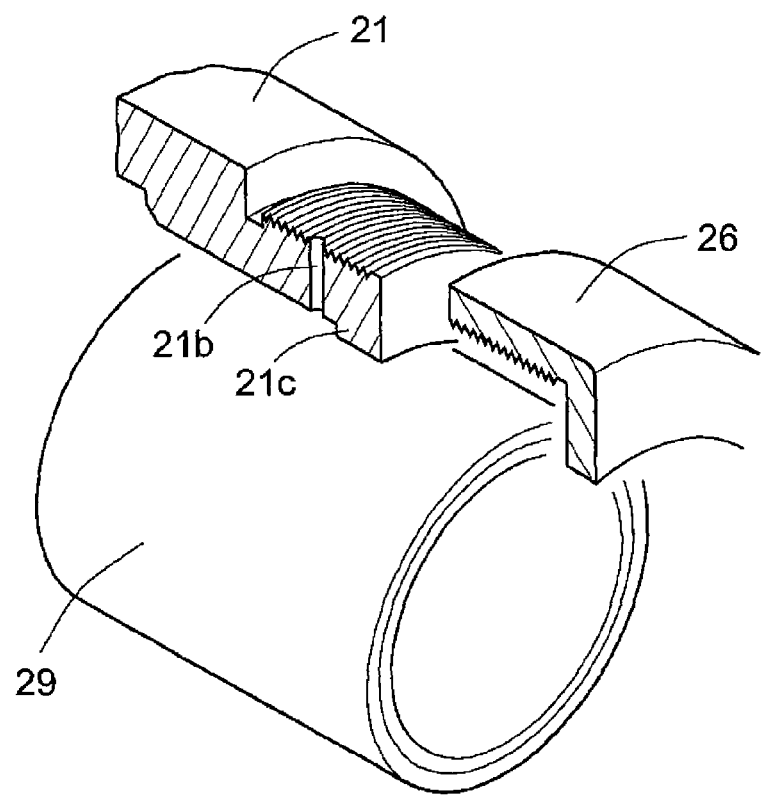

FIGS. 17 and 18 show Embodiment 4.

Embodiment 4

Embodiment 4 includes a cylindrical filter 29 comprising a plurality of cylindrical filter members fitted one around another. Embodiment 4 is otherwise structurally identical to Embodiment 3. Since this filter 29 is thicker than the filter of Embodiment 3, it can more effectively remove foreign matter.

Embodiment 4 may further include, at the first end of the valve main body 21, a cover plate 31 similar to the one used in Modification 1 of Embodiment 1, or a wire gauze 32 similar to the one used in Modification 2 of Embodiment 1.

Figure 19:
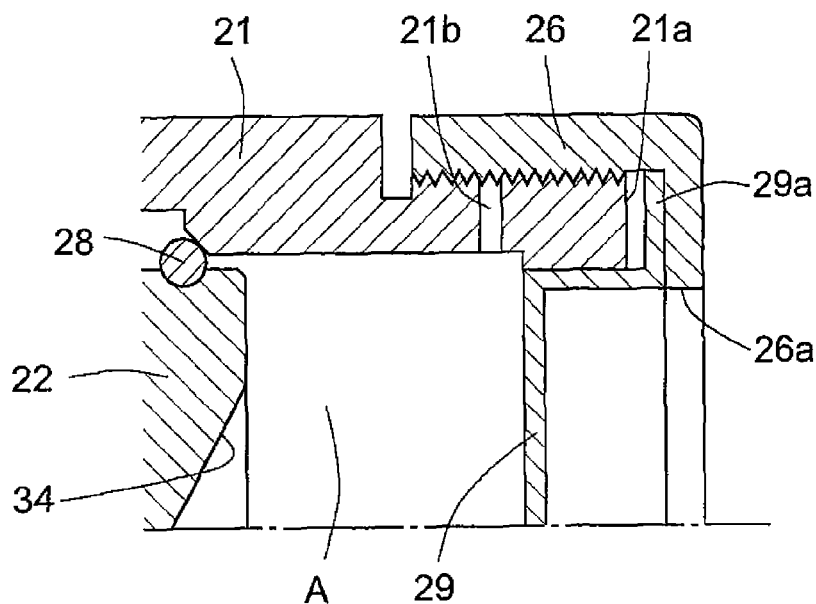
FIGS. 19 and 20 are a sectional view and an exploded perspective view, respectively, of a portion of a check valve of Embodiment 5.
Figure 20:
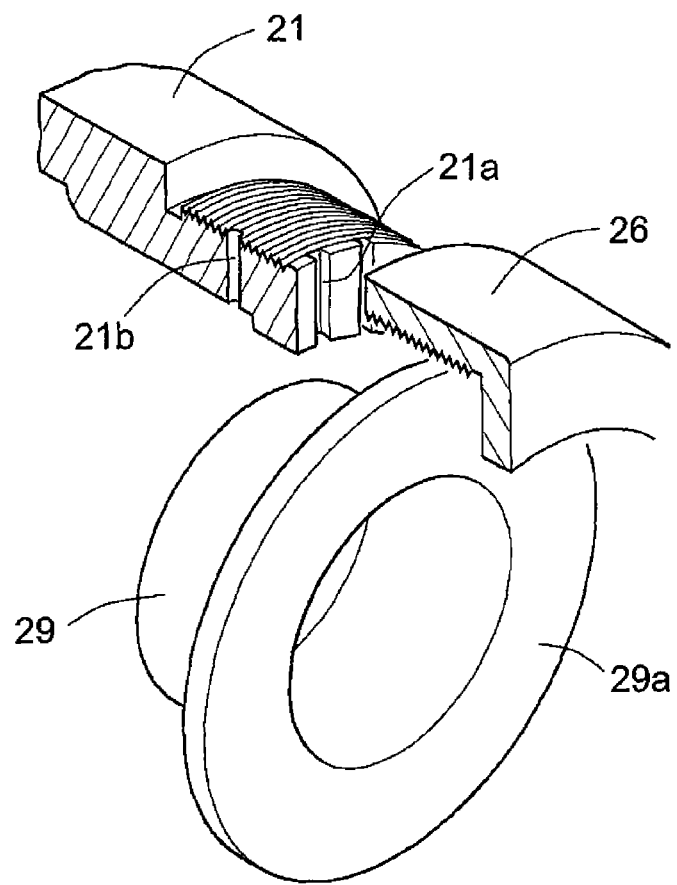

FIGS. 19 and 20 show Embodiment 5.

Embodiment 5

As shown in FIG. 19, Embodiment 5 includes a cylindrical cup-shaped filter 29 having a closed end on the side of the valve body 22 and fitted in the first end portion of the valve main body 21.

The cylindrical filter 29 has a radially outwardly extending flange 29a at its other end which is sandwiched between the first end of the valve main body 21 and the lid member 26. This arrangement increases the exposed surface area of the filter 29 and thus increases its ability to remove foreign matter.

In Embodiment 5, water vapor may turn into water drops in a flow passage A defined between the filter 29 and the valve body 22 due to a drop in bearing temperature when the bearing stops rotating or due to a change in air pressure in the bearing.

In order to discharge such water drops to the outside of the bearing, a water discharge hole 21b may be formed through which the flow passage A communicates with the outside of the valve main body 21 (see FIG. 20). Any water in the flow passage A can be sucked through the water discharge hole 21b due to capillary action and guided through the fitting portion between the first end of the valve main body 21 and the lid member 26 to the hole 26a of the lid member 26, which opens to the outside of the bearing.

In order to more effectively guide water that has been discharged from the flow passage between the valve body 22 and the filter 29 through the water discharge hole 21b to the fitting portion between the first end portion of the valve main body 21 and the lid member 26, to the opening 26a of the lid member 26, which opens to the outside of the bearing, a radial slit 21a may be formed in the first end surface of the valve main body 21 (see FIG. 20).

By fitting the lid member 26 to the first end of the valve main body 21, a passage is defined by the first end portion of the valve main body 21 and the lid member 26 through which the fitting portion therebetween communicates with the opening 26a of the lid member 26. Through this passage, water can be more effectively guided to the opening 26a of the lid member 26 due to capillary action.

A funnel-shaped axially concave recess 34 may be formed on the surface of the valve body 22 that faces the filter 29. Any water drops in the flow passage A are adhered to the inner surface of the recess 34, and thus can be collected to the central portion of the recess 34.

In Embodiment 5, a cover plate 31 similar to the one used in Modification 1 of Embodiment 1, or a wire gauze 32 similar to the one used in Modification 2 of Embodiment 1, may be provided at the first end portion of the valve main body 21.

Figure 21:
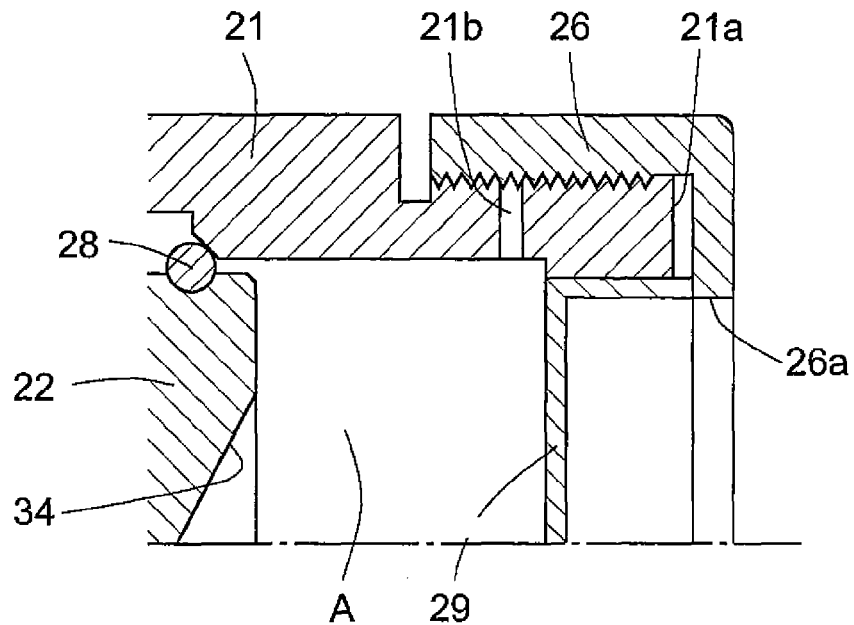
FIGS. 21 and 22 are a sectional view and an exploded perspective view, respectively, of a portion of a check valve of a modification of Embodiment 5.
Figure 22:
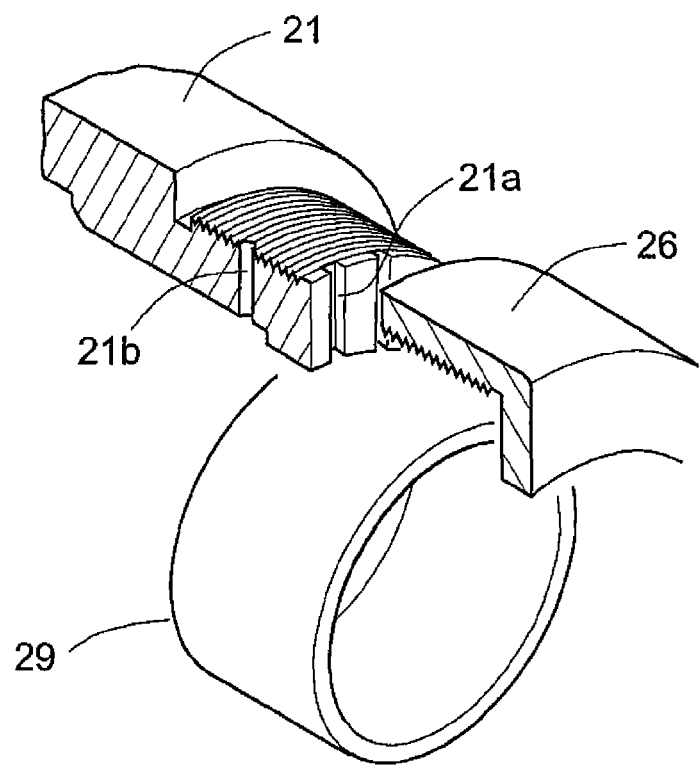

FIGS. 21 and 22 show a modification of Embodiment 5.

The filter 29 of this modified embodiment is a cylindrical cup-shaped member having a closed end and having no flange 29a. At its open end, the flange 29 is in abutment with the lid member 26 so as to be inseparable from the lid member 26. Otherwise, this modified embodiment is structurally identical to Embodiment 4.

What is claimed is:

1. A sealed rolling bearing comprising an inner race (1), an outer race (3), rolling elements (5) disposed between the inner race (1) and the outer race (3), and seal assemblies (7) sealing a bearing space defined between the inner race (1) and the outer race (3), wherein each of the seal assemblies (7) comprises a seal case (9) fitted on an axially outer end of the outer race (3), a seal (11) retained in position within the seal case (9), and a check valve (20) mounted in the seal case (9), wherein each of the check valves (20) comprises a cylindrical valve main body (21) defining a flow passage, and a valve body (22) movably mounted in the valve main body (21) to selectively open and close the flow passage to allow only a flow of gas from outside the bearing into the bearing space and prevent a flow of gas from the bearing space to the outside of the bearing, wherein each of the check valves (20) further comprises a filter (29) mounted in the flow passage and configured to allow passage of gas and prevent passage of liquid and solids, and wherein, in each of the seal assemblies (7):
   the seal case (9) comprises an annular portion having an axially inner side and an axially outer side, said axially inner side including an axially outwardly stepped surface (12) that extends around an entire circumference of the annular portion,
   the seal (11) is fitted inside the annular portion of the seal case (9) and retained in position by the annular portion of the seal case (9), and
   a hole (13) extends axially through the annular portion of the seal case (9), the check valve (20) being disposed in the hole (13), and at least a part of an opening of the hole (13) being flush with the stepped surface.

2. The sealed rolling bearing of claim 1, wherein, in each of the check valves (20), the filter (29) comprises a sheet member which allows passage of gas and prevents passage of liquid and solids, and is mounted in the flow passage between the valve body (22) and the outside of the bearing.

3. The sealed rolling bearing of claim 2, wherein, in each of the check valves (20), the valve main body (21) has a step (21c) extending radially inwardly from a radially inner surface of the valve main body (21) at one end of the valve main body (21), and wherein the filter (29) is a cylindrical member having a radially outer surface and is movable together with the valve body (22), with one end thereof closed by the valve body and with the radially outer surface thereof in sliding contact with a radially inner surface of the step (21c) over an entire circumference of the radially outer surface of the filter (29).

4. The sealed rolling bearing of claim 2, wherein, in each of the check valves (20), the filter (29) is a cylindrical cup-shaped member having a closed end and is mounted in the valve main body (21) with the closed end facing the valve body (22).

5. The sealed rolling bearing of claim 2, wherein, in each of the check valves (20), the filter (29) is one of a plurality of filters (29, 29') mounted in the flow passage, said filters being spaced apart from each other in a direction of a length of the valve main body (21).

6. The sealed rolling bearing of claim 2, wherein each of the filters (29) is a flat sheet.

7. The sealed rolling bearing of claim 6, wherein, in each of the check valves (20), the filter (29) is one of a plurality of filters (29, 29') mounted in the flow passage, said filters being spaced apart from each other in a direction of a length of the valve main body (21).

8. The sealed rolling bearing of claim 7, wherein each of the check valves further comprises a lid member (26) fitted on an end portion of the valve main body (21) facing the outside of the bearing and having an opening (26a) communicating with the flow passage, the lid member (26) being configured to prevent separation of the filters (29, 29') from the valve main body (21), wherein a space is defined between at least one of the filters (29') located nearer to the outside of the bearing and a radially inner surface of the valve main body (21), and wherein a passage (21a) is defined by the lid member (26) and the end portion of the valve main body (21) through which the space communicates with the outside of the bearing, whereby water in the space is discharged to the outside of the bearing through the passage (21a) by capillary action.

9. The sealed rolling bearing of claim 2, wherein each of the filters (29) is a disk-shaped sheet.

10. The sealed rolling bearing of claim 1, wherein, in each of the check valves (20), the valve main body (21) has a step (21c) extending radially inwardly from a radially inner surface of the valve main body (21) at one end of the valve main body (21), and wherein the filter (29) is a cylindrical member having a radially outer surface and is movable together with the valve body (22), with one end thereof closed by the valve body and with the radially outer surface thereof in sliding contact with a radially inner surface of the step (21c) over an entire circumference of the radially outer surface of the filter (29).

11. The sealed rolling bearing of claim 10, wherein each of the filters (29) comprises a plurality of cylindrical filter members fitted one around another.

12. The sealed rolling bearing of claim 11, wherein, in each of the check valves (20), the valve main body (21) is formed with a water discharge hole (21b) through which a portion of the flow passage between the filter (29) and the valve body (22) communicates with the outside of the bearing, whereby any water in the flow passage can be sucked into the water discharge hole (21b) by capillary action and then discharged to the outside of the bearing.

13. The sealed rolling bearing of claim 10, wherein, in each of the check valves (20), the valve main body (21) is formed with a water discharge hole (21b) through which a portion of the flow passage between the filter (29) and the valve body (22) communicates with the outside of the bearing, whereby any water in the flow passage can be sucked into the water discharge hole (21b) by capillary action and then discharged to the outside of the bearing.

14. The sealed rolling bearing of claim 13, wherein each of the check valves further comprises a lid member (26) fitted on an end portion of the valve main body (21) facing the outside of the bearing and having an opening (26a) communicating with the flow passage, the lid member (26) being configured to prevent separation of the filter (29) from the valve main body (21), wherein the water discharge hole (21b) is formed in the end portion of the valve main body (21) at a fitting portion between the valve main body (21) and the lid member (26), whereby water in the flow passage is guided to the opening (26a) of the lid member (26) through the fitting portion by capillary action.

15. The sealed rolling bearing of claim 14, wherein, in each of the check valves (20), a passage (21a) is defined between the lid member (26) and the end portion of the valve main body (21) through which the fitting portion communicates with the opening (26a) of the lid member (26), whereby water in the flow passage is guided to the opening (26a) of the lid member (26) through the passage (21a) by capillary action.

16. The sealed rolling bearing of claim 1, wherein, in each of the check valves (20), the filter (29) is a cylindrical cup-shaped member having a closed end and is mounted in the valve main body (21) with the closed end facing the valve body (22).

17. The sealed rolling bearing of claim 16, wherein, in each of the check valves (20), the valve body (22) is formed with an axially concave conical recess (34) on a surface of the valve body (22) that faces the filter (29).

18. The sealed rolling bearing of claim 16, wherein, in each of the check valves (20), the valve main body (21) is formed with a water discharge hole (21b) through which a portion of the flow passage between the filter (29) and the valve body (22) communicates with the outside of the bearing, whereby any water in the flow passage can be sucked into the water discharge hole (21b) by capillary action and then discharged to the outside of the bearing.

19. The sealed rolling bearing of claim 1, wherein each of the check valves further comprises a cover plate (31) covering an opening of the valve main body (21) at an end of the valve main body (21) facing the outside of the bearing, said cover plate (31) being formed with a slit (31a) communicating with the flow passage.

20. The sealed rolling bearing of claim 1, wherein each of the check valves further comprises a wire gauze (32) covering an opening of the valve main body (21) at an end of the valve main body (21) facing the outside of the bearing.

21. The sealed rolling bearing of claim 1, wherein, in each of the seal assemblies (7), the seal (11) is disposed radially inwardly of a radially innermost part of the stepped surface (12).

22. The sealed rolling bearing of claim 1, wherein, in each of the seal assemblies (7), an entirety of the check valve (20) is located outside the seal (11).

23. The sealed rolling bearing of claim 1, wherein, in each of the seal assemblies (7), a lip (15) of the seal (11) is in contact with the outer race (3).

24. The sealed rolling bearing of claim 23, wherein, in each of the seal assemblies (7), the lip (15) of the seal (11) includes a cutout (17) adjacent to the hole (13).

25. The sealed rolling bearing of claim 1, wherein, in each of the seal assemblies (7), the stepped surface (12) faces inwardly toward the axially outer end of the outer race (3).

* * * * *